Patented Jan. 20, 1948

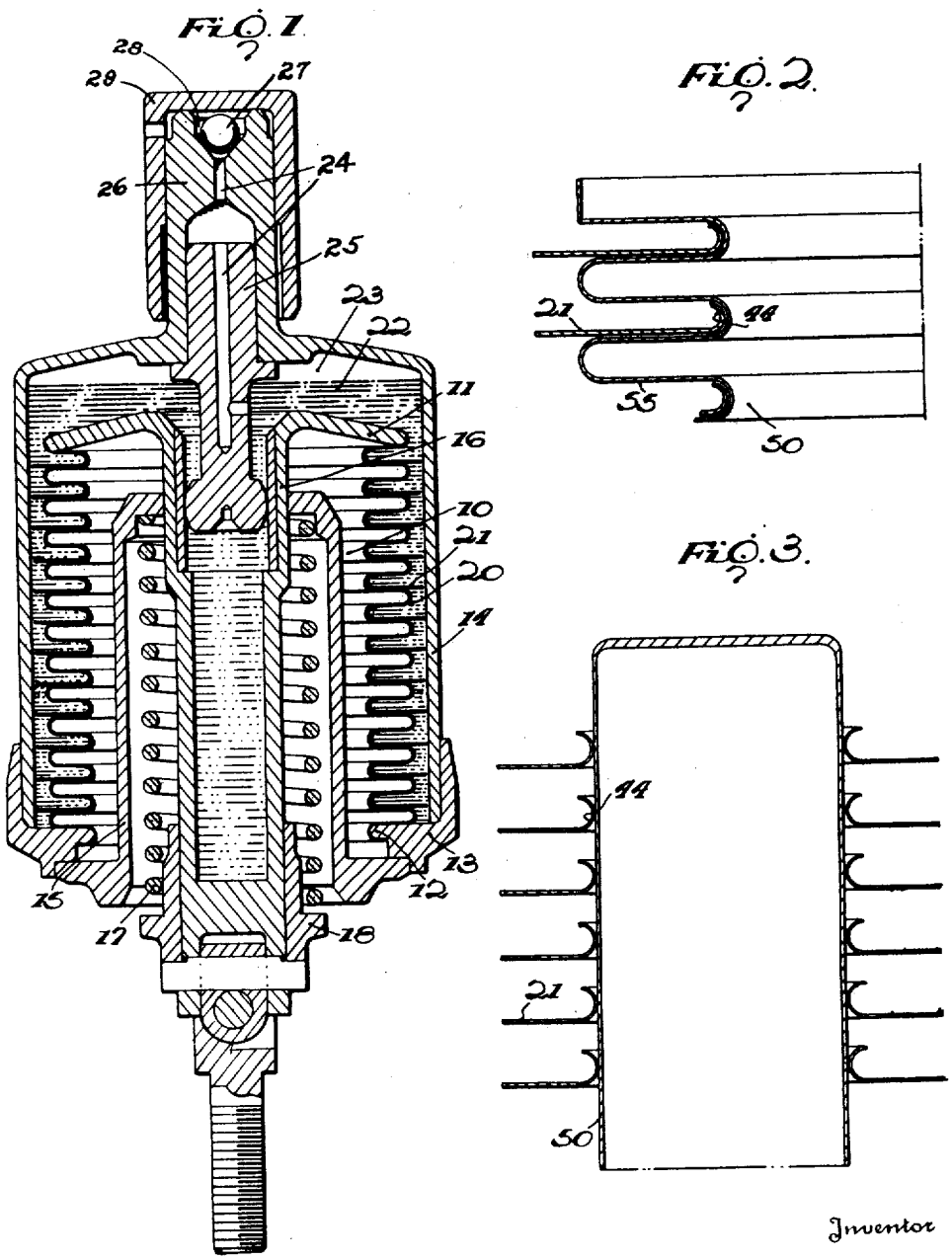

2,434,794

UNITED STATES PATENT OFFICE 2,434,794

DAMPED BELLOWS

Jean V. Giesler, Knoxville, Tenn., assignor to The Fulton Sylphon Company, Knoxville, Tenn., a corporation of Delaware Application May 11, 1942, Serial No. 442,514

5 Claims. (Cl. 137—156.5)

This invention relates to a novel damped bellows structure.

Metallic bellows when subjected to vibration whose frequency is close to the natural period of the bellows have been found to have a materially shortened life, and this has interfered to some extent with their use where they are likely to be subjected to rather severe vibrations, as on aircraft engines. Various mechanical damping means have been proposed, but while they were successful in reducing the amplitude of vibration of the bellows, they have had the defect that they have relied to a greater or lesser extent on the action of friction, and as friction varies under different conditions the use of friction to effect damping has resulted in erratic operation.

It is an object of this invention to provide a damped bellows which does not depend upon friction to effect the damping action.

Another object of this invention is to provide a damped bellows which avoids erratic action by using a principle of damping which effects a suppression of vibrational response both positively and uniformly.

Another object of this invention is to provide a damped bellows which utilizes the principle of a dash pot in effecting the damping action.

Other objects will appear as the description of the invention proceeds.

The invention is capable of receiving a variety of expressions, one of which is illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is an axial section through a bellows structure provided with damping means in conformity with the present invention;

Fig. 2 is an enlarged fragmentary section of a bellows to show the damping elements in position; and Fig. 3 is a diagrammatic view to illustrate the manner in which the damping elements are initially assembled with the tube before corrugation.

Referring first to Fig. 1, 10 designates a bellows of any suitable size, construction and material, here shown as in the form of a one-piece expansible and collapsible corrugated tubular wall having one end suitably attached to an end member 11 and its opposite end suitably attached to a flange 12 on a casing element 13. As shown, the bellows 10 is mounted in a tubular housing 14 having a reentrant wall 15 which is apertured at its inner end to slidingly receive a post 16 attached to or integrally formed on the movable end member 11. Post 16 is connected to any suitable element to be controlled and in the form shown a coil spring 17 is interposed between a flange or collar 18 on the post 16 and the inner end of the reentrant wall 15. As the present invention may be embodied in any bellows structure applied to any suitable operating or controlling mechanism, the means for mounting and connecting the bellows constitute no part of the present invention, and said mounting and connecting means are therefore to be taken as illustrative only.

In conformity with the present invention, one or more of the corrugations 20 of the bellows 10, and preferably all of them, have integrated therewith in any suitable way annular fins 21 which project radially and circumferentially beyond the periphery of the bellows. Surrounding the periphery of the fins 21 is a confining wall, here shown as the tubular wall 14 of the encasing structure, and said wall 14 is so disposed with respect to said fins as to make a small but predetermined clearance with the periphery of said fins. The space between the bellows 10 and the confining wall 14 is filled with a suitable liquid, preferably oil, said oil extending into the chamber 22 above the bellows as illustrated with a sufficient space 23 thereabove to provide for the movement of the oil next to be explained.

At any given position of the corrugations of the bellows, the spaces between the corrugations and fins are solidly filled with the oil, and therefore before movement of the bellows by way of expansion or contraction can occur it is necessary that the oil in the intercorrugation spaces between the fins be displaced from said spaces, if contraction of the corrugations is to be permitted, or that oil flow into said spaces, if expansion of the corrugations is to be permitted against the effort to create a vacuum. The flow of oil into or out of the intercorrugation spaces, as these spaces are increased or decreased in volume by the expansion or contraction of the bellows, therefore requires an appreciable period of time depending upon the rate of flow of the oil as determined by the clearance existing between the periphery of the fins 21 and the confining wall 14. By nicely predetermining this clearance the rate of oil flow and therefore the resistance to expansion or contraction of the corrugations can be accurately predetermined. Thus each corrugation provided with a fin acts in the nature of a dash pot and resists any tendency to vibrate at a relatively high frequency. Tests on structures of this type have shown that a considerably increased life has been given to a bellows subjected to a vibrational tendency, the vibration having been largely damped out owing to the dash pot action of the fins. As the flow of oil into and out of the intercorrugation effects a positive and uniform retardation of response to vibrational tendencies the damping action is effected without the irregularities which arise when friction is used to damp vibration.

Oil or other suitable liquid may be introduced into chamber 22 through passages 24 in guide and centering post 25 and in extension 26 on housing 14, and said passages may be closed by a ball 27 retained in cavity 28 by cap 29.

Assuming, as is preferred, that all of the corrugations are to have fins integrated therewith, the tube 50 (Fig. 3) which is to be corrugated has mounted thereon and equally spaced therealong a plurality of fins 21 corresponding in number with the corrugations to be formed, the spacing of the fins corresponding with the amount of metal that is to go into each corrugation.

The corrugating operation by which the fins are integrated with the bellows as the corrugations are formed may be carried out in any suitable way, as by known hydrostatic procedures. The corrugating operation being completed, the fins 21 assume the relationship to the completed corrugations 55 which is shown on an enlarged scale in the fragmentary section of Fig. 2.

It will therefore be perceived that the bellows with damping fins as described involves no mechanical attachment or connection of the fins to the metal of the bellows to in any way interfere with the normal characteristics of the metal in the bellows folds as respects its capacity to bend and to respond to elastic forces. At the same time the fins are actually integrated into the bellows structure and cannot become cocked or displaced with respect thereto because they are firmly held against displacement by reason of the curved inner flanges of the fins snugly fitting the curved inner bends of the corrugations.

It will therefore be perceived that by the present invention a novel damped bellows has been provided which avoids irregularity of action, producing a uniform and positive damping effect, because not depending on the use of friction but relying on a principle which is in the nature of a dash pot action. A novel bellows has also been provided whereby without altering the resilient and bending characteristics of the bellows metal the damping elements have been securely integrated into the bellows structure against undesired displacement.

While the embodiment of the invention illustrated on the drawings has been described with particularity, it is to be expressly understood that the invention is not limited thereto as changes in details of procedure and in the details of construction will now be readily apparent to those skilled in the art without departing from the spirit of the present invention. Within its broader aspects the method of damping here disclosed may be employed without use of damping elements on all of the bellows folds, the necessary clearance for controlling the flow of liquid into and out of the intercorrugation spaces may be provided otherwise than by a uniform clearance throughout the periphery of the fins, the fins and confining wells may each or both have configurations other than circular, other forms of damping elements may be used and they may be applied to the bellows in other manners, other expedients as apertures may be used for controlling liquid flow, and other provisions for securing dash pot action may be utilized, all as will now be apparent to those skilled in the art, without departing from the spirit of the present invention. Reference is therefore to be had to the appended claims for a definition of said invention.

What is claimed is:

1. In combination with a corrugated wall, means for damping vibration thereof including a confining wall surrounding said corrugated wall and containing a liquid which fills the spaces between the corrugations, and individual separate fins interlocked with said corrugations and projecting beyond the periphery of a plurality of corrugations of said wall and cooperating with said confining wall to predetermine the flow of said liquid into and out of said spaces as said wall is expanded and contracted.

2. In combination with a corrugated wall, means for damping vibration thereof including a confining wall surrounding said corrugated wall and containing a liquid which fills the spaces between the corrugations, and individual elements integrated with and projecting peripherally beyond at least some of the corrugations of said wall and having a predetermined close clearance with said confining wall for producing a dash pot action by retarding flow of said liquid around the periphery of said elements into and out of said corrugation spaces.

3. In combination with a corrugated wall, means for damping vibration thereof including a confining wall surrounding said corrugated wall and containing a liquid which fills the spaces between the corrugations, and separate elements projecting from at least some of the corrugations of said wall and having a predetermined clearance with said confining wall for retarding flow of said liquid around the periphery of said elements, said elements being integrated with the corrugations with which they are associated solely by the configuration of said elements and corrugations.

4. In combination with a corrugated wall, means for damping vibration thereof including a confining wall surrounding said corrugated wall and containing a liquid which fills the spaces between the corrugations, and a plurality of fins having inner curved extremities fitting the inner corrugations of said wall and having their outer peripheries projecting beyond the periphery of said corrugated wall.

5. In combination with a corrugated wall, means for damping vibration thereof including a confining wall surrounding said corrugated wall and containing a liquid which fills the spaces between the corrugations, and a plurality of fins having inner curved extremities fitting the inner corrugations of said wall and having their outer peripheries projecting beyond the periphery of said corrugated wall, said fins being locked in the intercorrugation spaces by the outwardly extending walls of the corrugations.

JEAN V. GIESLER.

REFERENCES CITED

The following references are of record in the file of this patent:

UNITED STATES PATENTS

| Number | Name | Date |
|---|---|---|
| 1,049,572 | Fulton | Jan. 7, 1913 |
| 1,151,777 | Fulton | Aug. 31, 1915 |
| 1,522,051 | Fulton et al. | Jan. 6, 1925 |
| 1,590,237 | Giesler | June 29, 1926 |
| 1,823,532 | Clifford | Sept. 15, 1931 |
| 1,980,264 | Giesler | Nov. 13, 1934 |
| 2,044,710 | Mantle | June 16, 1936 |
| 976,060 | Fulton | Nov. 15, 1910 |
| 1,905,583 | Giesler | Apr. 25, 1933 |
| 1,320,430 | Wheeler | Nov. 4, 1919 |
| 2,083,943 | Clifford | June 15, 1937 |
| 2,180,992 | Myers | Nov. 21, 1939 |
| 2,333,401 | Woods | Nov. 2, 1943 |
| 654,341 | Bristol | July 24, 1900 |
| 2,059,042 | Schweller | Oct. 27, 1936 |

FOREIGN PATENTS

| Number | Country | Date |
|---|---|---|
| 276,590 | Great Britain | Sept. 1, 1927 |
| 253,033 | Italy | May 2, 1927 |
| 22,185 | Great Britain | Oct. 8, 1906 |
| 89,696 | Austria | Oct. 10, 1922 |
| 458,624 | Great Britain | 1936 |